United States Patent [19]
Terao et al.

[11] Patent Number: 5,373,491
[45] Date of Patent: Dec. 13, 1994

[54] WAVELENGTH-MULTIPLE OPTICAL RECORDING MEDIUM

[75] Inventors: Motoyasu Terao, Tokyo; Norio Murase, Kokubunji; Shigenori Okamine, Kodaira, all of Japan

[73] Assignee: Hitachi, Ltd., Tokyo, Japan

[21] Appl. No.: 890,160

[22] Filed: May 29, 1992

[30] Foreign Application Priority Data

May 30, 1991 [JP] Japan .................................. 3-127192

[51] Int. Cl.$^5$ ........................................... G11C 13/00
[52] U.S. Cl. .................................... 369/102; 369/275.3
[58] Field of Search ................. 369/102, 275.1, 275.3, 369/275.4, 111, 109, 280, 283, 286

[56] References Cited

U.S. PATENT DOCUMENTS

| | | | |
|---|---|---|---|
| 4,422,159 | 12/1983 | Craighead et al. | 369/275.1 |
| 4,719,594 | 1/1988 | Young et al. | 369/286 |
| 4,782,477 | 11/1988 | Ichihara et al. | 369/286 |
| 4,807,218 | 2/1989 | Gerber | 369/275.3 |
| 4,876,667 | 10/1989 | Ross et al. | 369/286 |
| 4,924,436 | 5/1990 | Strand | 369/286 |
| 5,199,022 | 3/1993 | Suzuki et al. | 369/275.1 |

Primary Examiner—Paul M. Dzierzynski
Assistant Examiner—Keit T. Nguyen
Attorney, Agent, or Firm—Antonelli, Terry, Stout & Kraus

[57] ABSTRACT

A wavelength-multiple optical memory is provided which is capable of performing high density recording/reading at room temperature. A large number of cylindrical recording members, each of which is made up of plural portions along a central axis of the cylinder and plural sizes which vary slightly in a direction perpendicular to the central axis, are formed on a substrate. The cylindrical recording members may be of circular cylindrical or elliptical cylindrical shape. It is preferable that recording material layers of the cylindrical recording members have complex refractive indexes which are different from each other. A difference in size of the recording material layers of the circular or elliptical cylinders having sizes closest to each other is preferably in a range of 1/5000 to 1/5 of an average of the sizes, are even more preferably in a range of 1/500 to 1/10. Wavelength-multiple recording is performed by changing a wavelength of a light beam emitted from a light source within a very narrow range.

6 Claims, 5 Drawing Sheets

WAVELENGTH-MULTIPLE OPTICAL RECORDING MEDIUM

BACKGROUND OF THE INVENTION

The present invention relates to an information recording medium with information recording thin films which is capable of recording information, which is obtained by subjecting an analog signal relating to an image or voice for example to frequency modulation, or digital information relating to data of an electronic computer, a facsimile signal, or a digital audio signal for example at a real time by utilizing a recording energy beam such as light, a laser beam, or an electron beam, and more particularly to a wavelength-multiple optical recording medium in which the position of wavelength of a light beam to be applied, such as an absorption spectrum or a photo-luminescence excitation spectrum of a recording medium, is changed to record the information.

Since the width of the wavelength in which the optical characteristics are changed is vary narrow, the wavelength-multiple recording can be performed by only changing the wavelength of the light beam emitted from the light source in the narrow range.

The description will hereinafter be given to the principle, which has been known from long ago, of the wavelength-multiple recording by the hole-burning. The hole-burning is caused in the system in which the photoabsorption centers such as chromophore molecules or color-centers (called the guest) are diffused into the medium having an irregular structure such as an amorphous material, or a crystalline material having a colorcenter (called the host). Since the structure of the host is irregular, the photoabsorption spectra of a large number of guests are superimposed to provide the spread of the spectra to define an absorption band. When the laser beam having the wavelength within that absorption band is applied to the system, the photoabsorption corresponding to that wavelength of the absorption band is decreased. The portion in which the photoabsorption is decreased is called the hole. At a very low temperature near 2K, the relative larger width of the absorption band is 40 nm and the width of each hole is 0.02 nm or so. Therefore, a multiple recording of a multiplex number of 1000 or so can be expected.

In recent years, efforts for increasing a recording/reading temperature of the hole-burning memory to make the memory to be readily used have been continued. In the year 1990, as described in an article Extended Abstracts (the 51st Autumn Meeting, 1990): THE JAPAN SOCIETY OF APPLIED PHYSICS No. 3, p. 1001, 26a-ZC8 (Sep. 26, 1990), the recording/reading of the hole-burning memory is enabled to be performed at a temperature of 77K (i.e., at a liquid nitrogen temperature). However, at a temperature above 100K, it becomes difficult to perform a reading operation.

In 1991, two reported in an article OPTICS LETTERS, Vol. 16, No. 6, pp. 420-422, 1991 by S. Arnold, C. T. Liu, W. B. Whitten and J. M. Ramsey that if the chromophore is diffused to the vicinity of the surface of the balls of 10 $\mu$m or so diameter which are made of polystylene or latex and of which sizes vary slightly with the ball and the light beam is applied to the balls while changing the wavelength thereof step by step, the fluorescence having a strong intensity is observed from only the ball in which a certain relationship is established between the radius thereof a and the wavelength $\lambda$. This is, as shown in FIG. 1, considered to result from an effect that the optical standing wave which has the strong electromagnetic field in the ball and in the vicinity of the surface thereof is present (i.e., the resonance is generated) thereby to enhance the optical absorption. In accordance with this principle, even if not at a very low temperature, the width of the photoabsorption spectra of one, or plural balls each having a certain radius becomes very narrow, so that the broad absorption band can also be formed by utilizing the distribution of the radii of a great number of balls. Moreover, if a light beam having the specific wavelength within that absorption band is applied, only the photoabsorption near that wavelength is decreased, the hole is formed or not formed in the same position on the recording medium in correspondence to "1" or "0" of the information signal to be recorded while changing the wavelength inch by inch, whereby the hole-burning memory can be realized at room temperature. In this connection, if the position on the recording medium to which the light beam is to be applied is also changed in sequence, it is possible to realize the recording of a very large capacity.

Moreover, although the wavelength-multiple recording is not described at all, it is reported in an article IEEE TRANSACTIONS ON ANTENNAS AND PROPAGATION, Vol. AP-30, No. 2, pp. 168-172 (1982) by P. W. Barber, J. F. Owen and R. K. Chang that the resonance phenomenon as described above may also be generated in a circular cylinder or elliptic cylinder in the same manner. In this case, only the resonance in one solitary circular cylinder or elliptic cylinder is considered.

SUMMARY OF THE INVENTION

In the above prior art, the laser beam must be applied in a wide range in such a way that a large number of balls or circular cylinders fall within the irradiation range, and the wavelength-multiple recording of a large multiplicity cannot be performed. Thus, the actual recording density becomes lower than that of an optical disc as a prior art optical memory, so that the above prior art has hardly the practical merit as the optical memory.

It is therefore an object of the present invention to perform a wavelength-multiple recording of high multiplicity at room temperature and with a small area by solving the above-mentioned prior art problems.

As for the concrete means for attaining the above object, according to the present invention, there are provided;

(1) a wavelength-multiple optical recording medium in which a light beam is applied to record information in a multiplex manner while changing a wavelength thereof inch by inch, wherein a plurality of regions of which refractive indexes are different from that of a periphery and of which sizes are different from one another are arranged in the area irradiated by a reading light beam to construct a recording medium, (2) a wavelength-multiple optical recording medium according to the above aspect (1), wherein the recording medium includes a group of circular cylinders or a group of elliptic cylinders, (3) a wavelength-multiple optical recording medium according to the above aspect (2), wherein a difference in size between the elliptic cylinders having their sizes closest to each other is in the range of 1/5000 to 1/5 of an average of the sizes, (4) a wavelength-multiple optical recording medium in which a light beam is applied to record information in a multiplex manner while changing a wavelength thereof inch by inch, wherein the recording medium is constructed by laminating multiple layers, and an outer diameter of each layer corresponds to the associated wavelength, (5) a wavelength-multiple optical recording medium according to the above aspect (4), wherein the recording medium includes a group of circular cylinders or a group of elliptic cylinders, (6) a wavelength-multiple optical recording medium according to the above aspect (5), wherein a difference in size between two elliptic cylinders having their sizes closest to each other is in the range of 1/5000 to 1/5 of an average of the sizes, (7) a wavelength-multiple optical recording medium in which a light beam is applied to record information in a multiplex manner while changing a wavelength thereof inch by inch, wherein the recording medium is constructed by a large number of cylindrical members each of which is made up of plural portions of which sizes or thicknesses vary slightly with the portion, and (8) a wavelength-multiple optical recording medium according to the above aspect (7), wherein a different in size or thickness between two cylindrical members having their sizes or thicknesses closest to each other is in the range of 1/5000 to 1/5 of an average of the sizes or thicknesses.

DESCRIPTION OF THE PREFERRED EMBODIMENTS

Figure 1:
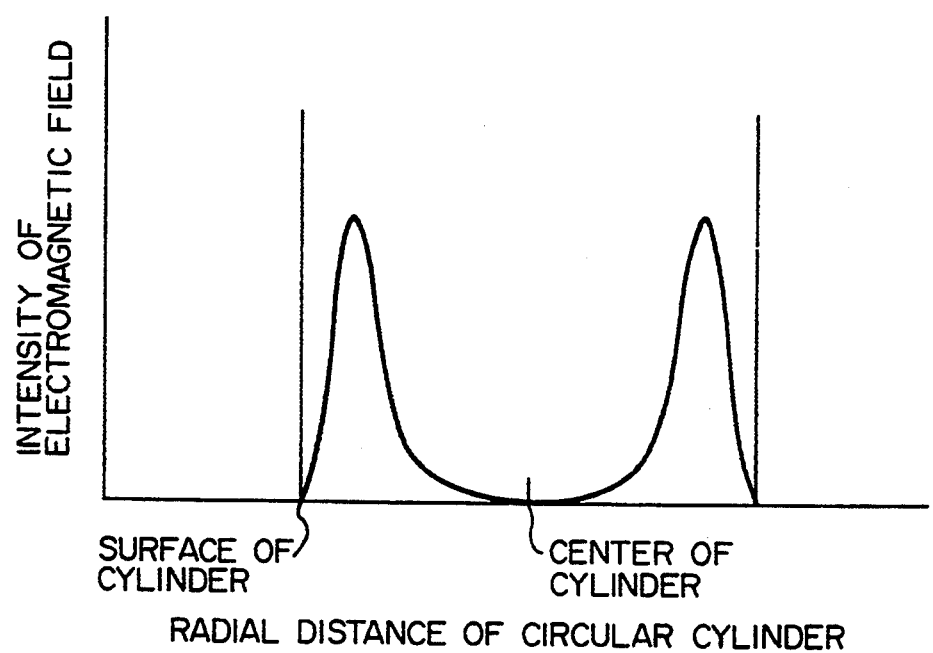
FIG. 1 is a graphical representation showing a resonance phenomenon used in recording and reproducing and appearing in the relationship between the radial distance of a circular cylinder and the intensity of an electromagnetic field.

In the present invention, a plurality of regions each of which has a refractive index which is different from that of the periphery and of which sizes are different from one another are arranged in the range of irradiation of a reading light beam to construct a recording medium, and a laser beam of which wavelength allows the associated resonance to be generated is applied to the regions while changing the wavelength inch by inch, thereby to perform the wavelength-multiple optical recording. In the case where a substrate having tracking grooves is employed, first, it is preferable to form a partially reflecting layer used for obtaining a tracking signal, or reading out an address and a synchronizing signal with a reflected light beam. Preferably, a recording medium is formed on the reflecting layer. At least one of the recording light beam and the reading light beam is applied substantially perpendicularly to the surface of the substrate. As for the preferred example of the arrangement of the above-mentioned recording medium, there are considered a group of elliptic cylinders (including also a group of circular cylinders as the specific example in which the length of the major axis is equal to that of the minor axis).

The extending (axial) direction of each cylinder in a group of elliptic cylinders may be perpendicular or parallel to a substrate. In this connection, the extending direction thereof is preferably perpendicular to the substrate because a recording medium is more readily manufactured. The arrangement in which elliptic cylinders having different diameter make a file in the direction of light propagation is preferable. Especially, the ratio of the length of the major axis to that of the minor axis is preferably in the range of 1:1 to 2:1. In order to form the recording medium in which a group of elliptic cylinders stand perpendicularly to the surface of the substrate, first, a lamination film made up of at least two layers made of a recording material and other layers is formed. With each recording material layer, the surface, the internal portion or the whole layer preferably contains the photoabsorption centers such as chromophore. A layer of which complex index of refraction is slightly different from that of each recording material layer is preferably formed between the adjacent recording material layers to reflect the light beam. It is more preferable that this layer is made of an organic material and its refractive index is lower than that of each recording layer. It is more preferable that a layer for reflecting a light beam is further provided between that layer and the recording layer. Although the light beam reflecting layer can be made of an organic material, it is preferably made of an inorganic material such as an oxide, sulfide, selenide, fluoride, nitride or a metal. In the case of the metal, the light beam reflecting layer must be thinned to have a thickness less than or equal to 50 nm. The thickness of the recording material layer is preferably less than or equal to the size of the elliptic cylinder (the diameter of the circular cylinder, or the major axis length of the elliptic cylinder). Although the total thickness of the materials between the two recording material layers may be less than or more than the size of the elliptic cylinder, it is preferably more than the thickness of the recording material layer. In order to make the lamination film into a group of elliptic cylinders, for example, a layer made of a photo resist is formed on the most upper layer, and then the etching is performed with the photo resist as an etching mask to form the group of elliptic cylinders. The sizes of the most upper portions of all the elliptic cylinders are preferably the same. In this connection, however, in the etching process for forming the elliptic cylinders, the size of the upper layer is made slightly different from that of the lower layer by utilizing the laminated layers having their characteristics different from one another. The lower portion (near the substrate) preferably has a larger diameter than that of the upper portion in terms of the adhesive property of the elliptic cylinder to the substrate and the shape-stability. As a result, the wavelength of the light beam to be resonated in the upper recording layer is slightly different from that of the light beam to be resonated in the lower recording layer, so that the wavelength-multiple recording can be performed. Even when a plurality of cylinders having the same size are provided, if the cylinders having the size different therefrom are additionally provided, the object of the present invention is attained. After making the group of elliptic cylinders in above mentioned process, chromophore molecules are diffused in the area cross to the surface of each cylinder by placing the recording medium in a liquid or a gass containing chromophore. In the above description, the sizes (diameters) of the recording layers of the elliptic cylinders vary with the recording layer from above downward. However, in addition thereto, the thicknesses of the recording layers may vary with the recording layer with the sizes thereof being the same, or both the sizes and thicknesses of the recording layers may vary with the recording layer. In the case where the size (diameter) of the elliptic cylinder is made to be smaller than the range of irradiation of the light beam, even if the recording layer of the elliptic cylinder is a single layer, the wavelength-multiple recording can be performed by applying the light beam having the selected wavelength to the associated elliptic cylinder or circular cylinder to be optically resonant with that light beam, since a plurality of elliptic cylinders which are different in size or thickness from one another fall within the range of irradiation of the light beam. But, in this case, the technology of forming a small elliptic cylinder is required. Moreover, with the above-mentioned elliptic cylinders, a difference in size or thickness between the two recording layers having their sized or thicknesses closest to each other is preferably in the range of 1/5000 to 1/5 of the average of the sizes or thicknesses, and especially, it is preferably in the range of 1/500 to 1/10 of the average of the sizes or thicknesses. The space surrounding the individual elliptic cylinders is preferably filled with a material of which a complex index of refraction is slightly different from those of the elliptic cylinders, thereby to reflect the light beams from the interfaces. This material may be a gas such as air. Moreover, the material used for the light beam reflecting layer may be deposited to the side face of each elliptic cylinder. If after the plurality of recording layers are formed as described above, the light beam reflecting layer made of a metal is further formed thereon and then the etching is performed, such an effect can be expected that the intensity of the reflected reading light beam is increased. As for the metal used therefor, almost all of the metals such as Al and Au may be available. Instead thereof, the layer made of a semimetal, a semiconductor or a dielectric with high refractive index may be provided. In the case where the substrate having tracking grooves is employed, it is preferable that a coating layer for filling in the tracking groove is formed on the reflecting layer on the substrate, and the above lamination film is formed on the coating layer. In the case where the number of layers to be laminated is larger, such a technique is preferably taken that whenever some layers are laminated, the lamination is interrupted, and then, the replicating layer made of a U. V. light curing resin, the reflecting layer and the coating layer which are used for obtaining the tracking signal, or reading out the address and the synchronizing signal are provided by the known replicating method using the U. V. light curing resin, and the like, and as a result, even if the focal position is shifted, the tracking signal may be obtained, and the address and the synchronizing signal may be read out using the reflected light beam. In this case, before the replicating layer made of the U. V. light curing resin is provided, the space surrounding the above columns of the elliptic cylinder-like lamination film is more preferably filled with an organic material with low refractive index.

As another example of the arrangement of the above recording medium, it is considered that the recording medium is constructed by a large number of elliptic cylinders which have the uniform size and construction material and of which refractive indexes are different from that of the periphery and sizes are slightly different from one another, the sizes of the elliptic cylinders vary slightly with the elliptic cylinders along the direction of the optical axis of the reading light beam, and the laser beam having a wavelength allowing the associated elliptic cylinder or cylinders to resonate is applied to the associated elliptic cylinder or cylinders while changing the wavelength inch by inch thereby to perform the wavelength-multiple optical recording/reading. But, even when a plurality of elliptic cylinders having the same size are provided along the direction of the optical axis of the reading light beam, if the elliptic cylinders having their sizes different therefrom are additionally provided, the object of the present invention is attained. It is advantageous in terms of the manufacture of the recording medium and the processing of the reading signal that when viewed from the direction approximately perpendicular to the optical axis of the reading light beam, a plurality of elliptic cylinders having the same size form a line. It is preferable that the space surrounding the individual elliptic cylinders is filled with a material of which complex index of refraction is slightly different from that of each elliptic cylinder to reflect the light beams from the interfaces therebetween. This material may be a gas such as air. It is more preferable that this material is an organic material and the refractive index thereof is smaller than that of the recording material. The elliptic cylinder is more preferably divided into two or more portions along the longitudinal direction through one or more layers for reflecting the light beam from one or more interfaces. Such a technique may be taken that this light beam reflecting layer is divided into two portions and a different layer is inserted therebetween. Although this light beam reflecting layer may be made of an organic material, it is preferably made of an inorganic material such as an oxide, sulfide, selenide, fluoride, nitride or a metal. The thickness of the recording material layer is preferably less than or equal to the size of the elliptic cylinder. Moreover, although the total thickness of the materials between the two recording material layers may be less than or more than the thickness of the recording material layer, it is preferably more than the thickness of the recording material layer. Such an elliptic cylinder is preferably formed by the pattern exposure, the etching and the like using a photo resist for example. The difference in size between the two elliptic cylinders having their sizes closest to each other is preferably in the range of 1/5000 to 1/5 of the average of the sizes, and especially preferably in the range of 1/500 to 1/10 of the average of the sizes. By taking such construction, the recording/reading operation can be performed without changing the wavelength of the light beam emitted from the light source in an excessively wide range. At the same time, it is also possible to manufacture a recording medium of good reproducibility. In the case where the number of arrangements of elliptic cylinders is large, it is the same as in the above first example that whenever some layers are laminated, the replicating layer including the trench and the like made of the U. V. light curing resin, the reflecting layer and the coating layer are preferably formed by the known replicating method using the U. V. light curing resin, and the like, and before the replicating layer is formed, the space surrounding the elliptic cylinders is preferably filled with the organic material of low refractive index.

As another method of forming the elliptic cylinder in the above-mentioned two examples, suitable ions may be implanted from the position above a mask material through which elliptic holes (including circular holes) are bored into the material under the mask material to form elliptic cylinder-like implantation regions. In this case, the material of the region surrounding the elliptic cylinder-like implantation regions don't need to be removed. As a result, the material containing no ions fills in the region surrounding the elliptic cylinder-like implantation regions.

Figure 3:
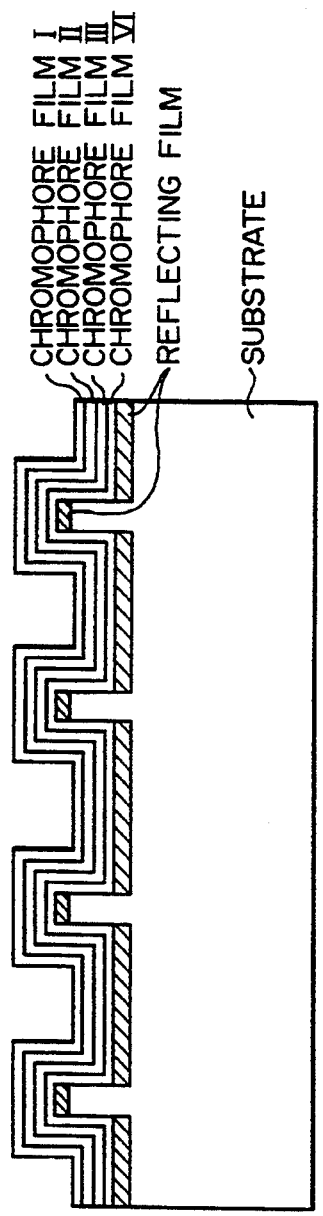
FIG. 3 is a cross sectional view showing the construction of a recording medium of one embodiment according to the present invention.
Figure 4:
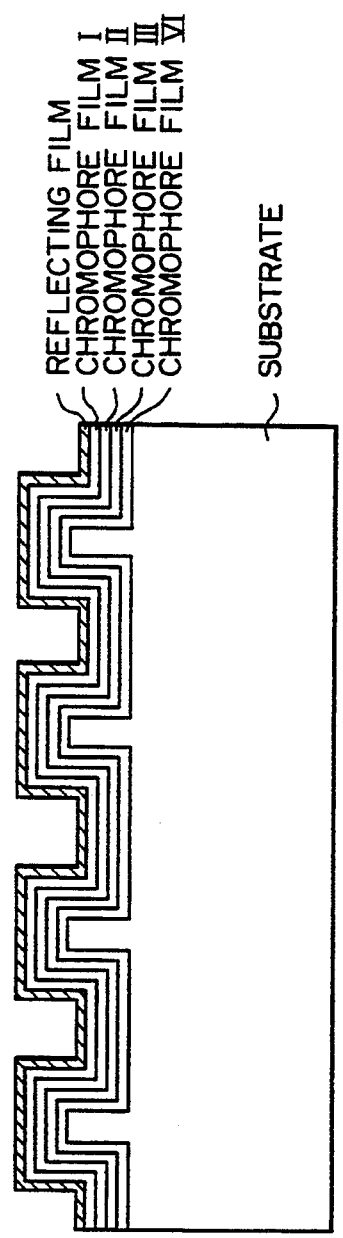
FIG. 4 is a cross sectional view showing the construction of a recording medium of another embodiment according to the present invention.

Moreover, such a technique may be taken that as shown in FIG. 3. More particularly, a group of circular elliptic cylinder-like projections are formed on the surface of the information recordable area of the substrate by the injection molding method using polycarbonate or the replicating method using the U. V. light curing resin, and organic material layers which contain the chromophore and have different refractive indexes are formed in the form of a multilayer in the periphery of the projections. Or, instead thereof, light absorbing inorganic material layers having different refractive indexes may be formed in the form of a multilayer. Even in the case where the material layers having substantially the same refractive index are formed in the form of a multilayer, such a technique may be taken such that an organic or inorganic material layer of which a refractive index is different from that of each material layer is formed between the adjacent material layers to reflect the light beam from the interface therebetween. In this case, it is advantageous that if a film made of materials such as a metal or a dielectric for shedding an organic material is previously deposited to the surface of the substrate by the sputtering method or the like, the above organic material is difficult to be deposited to the portion other than the side face of the projection because the film becomes thick at the portion other than the side face of the projection. The above layer made of a metal or the like may also act as the light beam reflecting layer. The light beam reflecting layer may not be deposited directly to the surface of the substrate but may be deposited to the surface of the multi-organic material layer, as shown in FIG. 4. These structures of the recording media means that the cylindrical parts having different sizes can exist in a state sharing the center of the cylinder and the crosssection is a concentric circle or ellipse instead of a state piling up in the direction of the center axis of the cylinder.

The recording medium may not be constructed in the form of elliptic shape but may be constructed in the form of prismatic shape. In this case, however, the resonant-scattering and absorption of the incident light beam are difficult to be generated. However, if the recording medium is constructed by arranging the balls or ellipsoids of revolution, this is advantageous for the resonant-scattering and absorption. In this case, however, the recording medium is difficult to be readily manufactured.

In order to prevent the generation of a non-sharp peak of the resonance due to a multiple scattering among the elliptic cylinders, it is desirable that preferably, the peaks of plural resonances don't overlap the same wavelength as much as possible, and especially preferably, all of the peaks of plural resonances don't overlap the same wavelength, with respect to the elliptic cylinders having different sizes, or the portions of the elliptic cylinder having different sizes and/or thicknesses.

As the chromophore or the chromophore-polymer mixture contained in the recording layer, the material which has already been known as the material for the hole-burning memory, or the other optical reactant type material, e.g., the photochromic material may be used. Especially, it is preferable that if such a material as to be excited by applying the two light beams having different wavelengths thereto but hardly excited by applying only one of them thereto is used, it is possible to prevent the destruction of the recording state due to the repetitive reading operations. As the polymer for the recording layer and the polymer layer containing no chromophore, the various kinds of polymer, such as a latex and polystyrene, which are not used much heretofore as the material for the hole-burning memory may also be used. Moreover, the inorganic material for the hole-burning memory, such as an oxide glass containing trivalent rare earth ions, e.g., a silicate glass doped with $Pr^{3+}$, or any other colored inorganic materials may also be used. With some of them, the recorded information can be erased by the known method.

As the material for the substrate, glass, plastic such as polycarbonate, or a metal such as an Al alloy can be used.

At least one of the recording and reading may be performed utilizing the light having a large number of wavelength components to raise the efficiency.

The recording medium is constructed in such a way that a large number of cylinders in which the sizes of the cylinders or the thicknesses of the recording layers vary slightly with the cylinder or recording layer, or a large number of balls or ellipsoids of revolution of which radii vary slightly with the ball or ellipsoid of revolution are provided to be arranged in the direction of scanning of the reading light beam, or in the direction making an angle with the scanning direction, whereby a large number of optical absorption bands can be disposed in the individual positions on the recording medium at predetermined intervals of wavelength and thus the recording of very high density can be realized.

Embodiment 1

Figure 2:
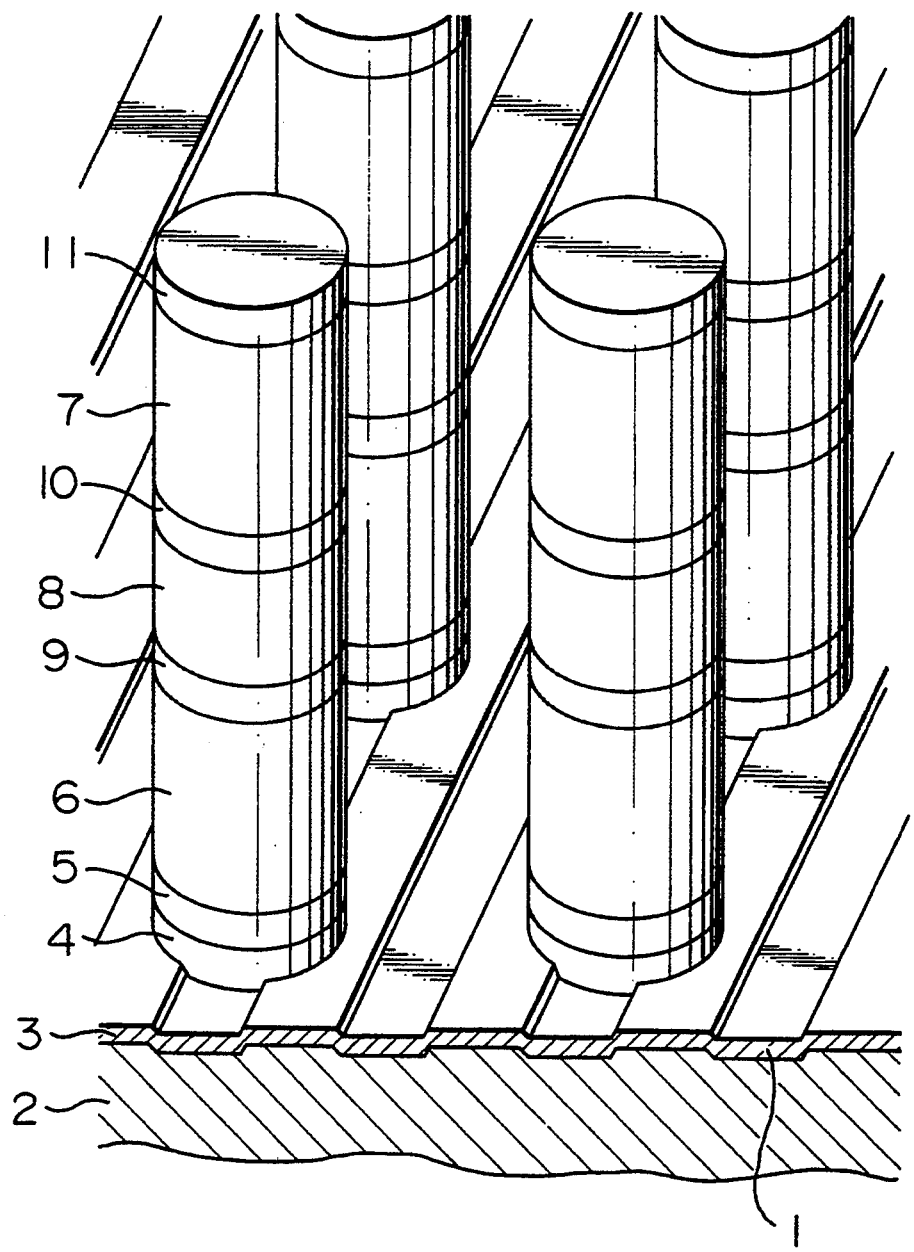
FIG. 2 is a perspective view showing the structure of a recording medium of one embodiment according to the present invention.

As shown in FIG. 2, on the surface of a substrate 2 which is constructed by a doughnut-like glass plate having a diameter of 13 cm and a thickness of 1.1 mm, a trench 1 for the tracking of 1.4 μm pitch, and pits for representing addresses of the tracks and the sectors, and a synchronizing signal are formed by processing a U. V. light curing resin. First, a ZnS layer 3 of 20 nm thickness which is to form a reflecting layer for reading out the address and the synchronizing signal through the reflected light beam is formed on the substrate 2. Next, a polystyrene layer 4 of 150 nm thickness which contains no chromophore and is used to fill in the tracking trench is applied to the ZnS layer 3. Further, a ZnS layer 5 of 20 nm thickness as an interface light beam reflecting layer is formed. Subsequently, recording layers 6 and 7 each of which is a mixture of polymer and chromophore and which have the following thicknesses, respectively, are formed in this order. In this connection, nile red is used as the chromophore and a latex is used as the polymer. A polystyrene layer 8 which contains no chromophore and of which a complex index of refraction is slightly different from that of the layer containing the chromophore is formed between the recording layers 6 and 7. Further, each of ZnS light beam reflecting layers 9, 10 and 11 of 20 nm thickness is provided between the layer containing the chromophore and the layer containing no chromophore. The thickness of the layer of the mixture of the polymer and the chromophore is set to about 1.4 $\mu$m. The thickness of the layer containing no chromophore is set to about 1.6 $\mu$m. After laminating the above layers in such a manner, a photo resist is applied to the most upper layer. Then, a mask for exposure in which circular light transmission regions of about 1.4 $\mu$m diameter are arranged at a pitch of about 2.8 $\mu$m with respect to the track direction as well as the radial direction of the disc is brought in tight contact to the disc, and then is irradiated with the light beams to expose the photo resist to the light beams. Thereafter, the developing is performed to form a predetermined pattern. Then, the above lamination layer is etched to form a plurality of circular cylinders with the patterned photo resist as an etching mask. In this connection, the etching is performed in such a way, by utilizing the lamination of the layers having different characteristics, that the diameter of the upper layer of the circular cylinder is slightly different from that of the lower layer thereof. After the formation of the circular cylinders, the circular cylinders are immersed in the solution in which the nile red as the chromophore was dissolved to diffuse the nile red thereinto. The portion nearer the surface has the higher concentration of the chromophore. At this time, the chromophore is hardly diffused into the polystyrene layer. The chromophore may not be contained initially in the latex layer since the chromophore will be diffused into the latex layer later. After the formation of the circular cylinders, ZnS may be deposited to the side face of each circular cylinder.

If in addition to the formation of the plurality of recording layers as described above, a light beam reflecting layer made of a metal is provided, such an effect can be expected that the intensity of the recording light is increased, and so forth. As for the metal used therefor, almost all of the metals such as Al and Au may be available. Instead thereof, the layer made of a semimetal, a semiconductor, or a dielectric with high refractive index may be provided.

The dye laser beam is applied from the substrate side to the disc-like recording medium thus formed in such a way that the diameter of the optical spot (half-width) on the layer of the mixture of the chromophore and the polymer becomes 1 $\mu$m or so, while rotating the disc-like recording medium. At the same time, the intensity of the laser beam is sometimes increased and otherwise decreased to record the information on the tracks while performing the tracking on the tracking trench. The wavelength of the dye laser beam is changed from the long wavelength to the short wavelength inch by inch so that just when the disc makes one rotation, the wavelength thereof is changed to a wavelength corresponding to the subsequent region of a group of circular cylinders each having the subsequent size. The focal position of the light beam becomes deep as the wavelength becomes shorter. Since the tracking trench is spiral, when the disc makes one rotation, the optical spot is jumped to be returned to the original track so that the information is recorded in the same track with the changed wavelength. When the wavelength is changed in such a manner, the recording is performed from the layer nearer the substrate. As a result, paying attention to the same position on the track, it is readily understood that the wavelength-multiple recording is realized.

The reading operation is performed in such a way that the reading light beam having a fixed intensity is applied perpendicularly to the surface of the substrate to be applied to the associated circular cylinders through the substrate, and the change in intensity of the fluorescence is detected by a photodetector which is placed in the position deviated from the position right above the portion from which the reading light beam is applied. In this connection, the change in intensity of the transmitted light beam or the reflected light beam may be detected.

If the photo resist layer is formed a every formation of the recording layer, and after the etching, the remaining photo resist is removed to form the individual portions of each circular cylinder while varying the sizes of the portions inch by inch, the necessary circular cylinders can be more surely obtained. Moreover, the thickness of the recording layer may be changed with the size thereof not being changed, or both the size and the thickness may be changed.

In at least one of the recording operation and the reading operation, the laser beams may not be collected but a large number of circular cylinders may be irradiated simultaneously with the plane wave. In the case where in the reading operation, the light beams are not collected but the plane wave is applied, it is preferable that a large number of detectors for detecting the light beams from the recording medium are arranged to allow much information to be detected simultaneously. In this case, the wavelength discrimination performance becomes more excellent. In the case where one detector or a small number of detectors are arranged, the relative position between the recording medium and the detector, or that between the lens and the detector is moved to determine the circular cylinder from which the information is to be read out.

Instead of the circular cylinders, even if the elliptic cylinders are formed, there is obtained substantially the same effect.

If the size of the circular or elliptic cylinder is made to be smaller than the range of irradiation of the light beam, the reading layer may be a single layer. Further, if on the side face of the circular cylinder of single layer made of a latex or polystyrene for example, latex layers which contain the chromophore and have their refractive indexes different from one another due to the difference of density or the like are formed in the form of multilayer, the wavelength-multiple recording can be performed in each circular or elliptic cylinder. In this connection, the kind or concentration of chromophore may vary with the layer. Moreover, as shown in FIG. 3, such a technique may be taken by the injection molding method employing polycarbonate, or by a replicating method employing the U. V. light curing resin, a group of circular or elliptic cylinder-like projections are provided on the surface of the substrate, and organic material layers which contain the above chromophore and have their refractive indexes different from one another are formed in the form of a multilayer in the periphery of those projections. Moreover, even in the case where the organic material layers which are made of one kind of chromophore containing acrylic resin for example and have substantially the same refractive index are formed in the form of multilayer, if a layer, such as a ZnS layer, of which a refractive index is different from that of any organic material layer just described above is provided between the adjacent organic material layers, a good result can also be obtained. In this case, if a film made of a metal or a dielectric material for shedding an organic material is previously deposited to the surface of the substrate by the sputtering method or the like, the above organic material is advantageously difficult to be deposited to the portion other than the side face of the projection because the film thickness becomes large at the portion other than the side face of the projection. The above layer made of a metal or the like may also act as the light beam reflecting layer. The light beam reflecting layer may not be deposited to the surface of the substrate but may be deposited to the surface of the multi-organic material layer, as shown in FIG. 4. Recording and reproducing information is also possible with a recording medium with the multi-organic material layer and without the reflecting layer. The multi-organic material layer can be replaced by a multi-inorganic material layer.

Embodiment 2

Figure 5:
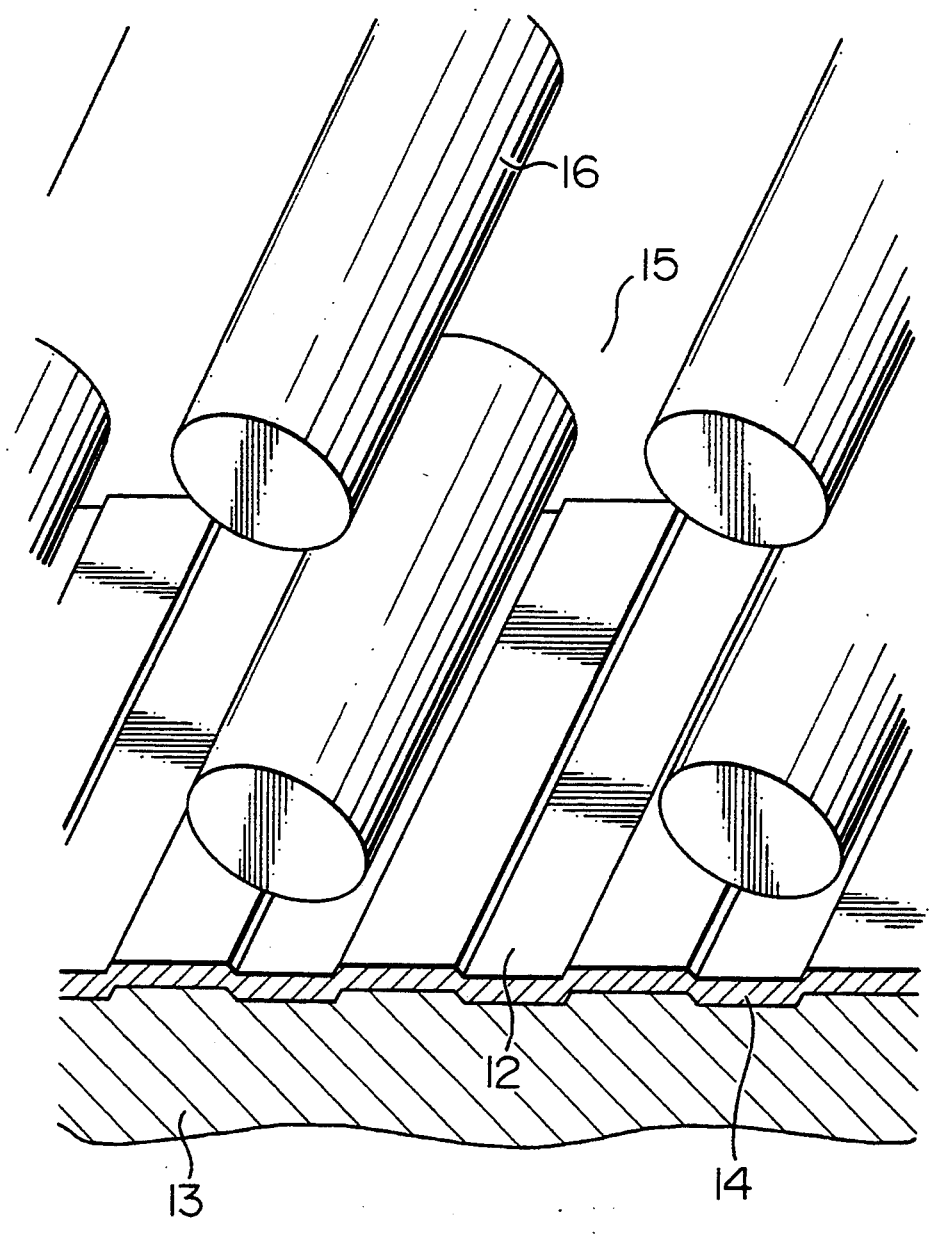
FIG. 5 is a perspective view showing the structure of a recording medium of another embodiment according to the present invention featuring a circular cylinder arrangement.

As shown in FIG. 5, on the surface of a substrate 13 which is constructed by a doughnut-like glass plate having a diameter of 13 cm and a thickness of 1.1 mm, a trench 12 for the tracking, and pits for representing addresses of the tracks and the sectors and a synchronizing signal are formed by processing a U. V. light curing resin. First, a ZnS layer 14 of 20 nm thickness which is to form a reflecting layer for reading out the address and the synchronizing signal through the reflected light beam is formed on the substrate 2. On the other hand, a polymer layer is first formed on a thin glass sheet of 100 $\mu$m thickness. A latex is used as the polymer. The thickness of that layer is set to about 8 $\mu$m. Next, a photo resist layer is formed on the glass sheet body. Subsequently, a chrome coated mask formed on a glass plate is brought in tight contact to the photo resist layer to perform the exposure, and then, the photo resist layer is subjected to the developing process to remove the unnecessary portion. Then, the recording material layer is etched with the patterned photo resist layer as an etching mask, so that a large number of circular cylinders are formed so as to be arranged in a matrix-like configuration. In one direction of the matrix (i.e., in the direction going away from the substrate), the circular cylinder of 1.40 $\mu$m size, the circular cylinder of 1.45 $\mu$m size, the circular cylinder of 1.50 $\mu$m size, and the circular cylinder of 1.55 $\mu$m size are arranged in this order with each row. Thus, in that direction, the sizes of the circular cylinders vary with the circular cylinder in a step of 0.5 $\mu$m. In the direction perpendicular to the above direction, the circular cylinders having the same size are arranged with each column. Then, this thin glass sheet having the circular cylinders formed thereon is immersed in the solution in which the nile red as the chromophore was dissolved to diffuse the nile red into the portions near the surfaces of the circular cylinders. Thereafter, the above thin glass sheet is divided into a plurality of chips each having the size of 30 mm long $\times$ 1 mm wide. Those chips are mounted on the disc substrate so as to extend from the positions of about half of the diameter from the center outward and radially. In this connection, those chips are arranged in such a way that the flat surface of each thin glass sheet chip 15 is perpendicular to the disc substrate, and the sizes of the circular cylinders 16 are different in the direction perpendicular to the substrate. It is more advantageous that if after the thickness of the thin glass sheet is reduced by the etching, the thin glass sheet is mounted to the substrate, a large number of glass sheet chips can be mounted more densely.

The wavelength of the dye laser beam is changed from the long wavelength to the short wavelength inch by inch, so that just when the disc substrate makes one rotation, the wavelength thereof is changed to a wavelength corresponding to the group of circular cylinders having the subsequent size. The focal position of the light beam becomes deep as the wavelength becomes longer. But, the other respects are the same as in the embodiment 1, and thus, the wavelength-multiple recording is realized.

The reading operation is performed in the same manner as in the embodiment 1.

It is the same as in the embodiment 1 that as the material used to form the recording layer, other materials may also be available.

It is also the same as in the embodiment 1 that in the recording or reading operation, the laser beams are not collected but the plane wave may be applied, and instead of the circular cylinders, the elliptic cylinders may be formed.

Figure 6:
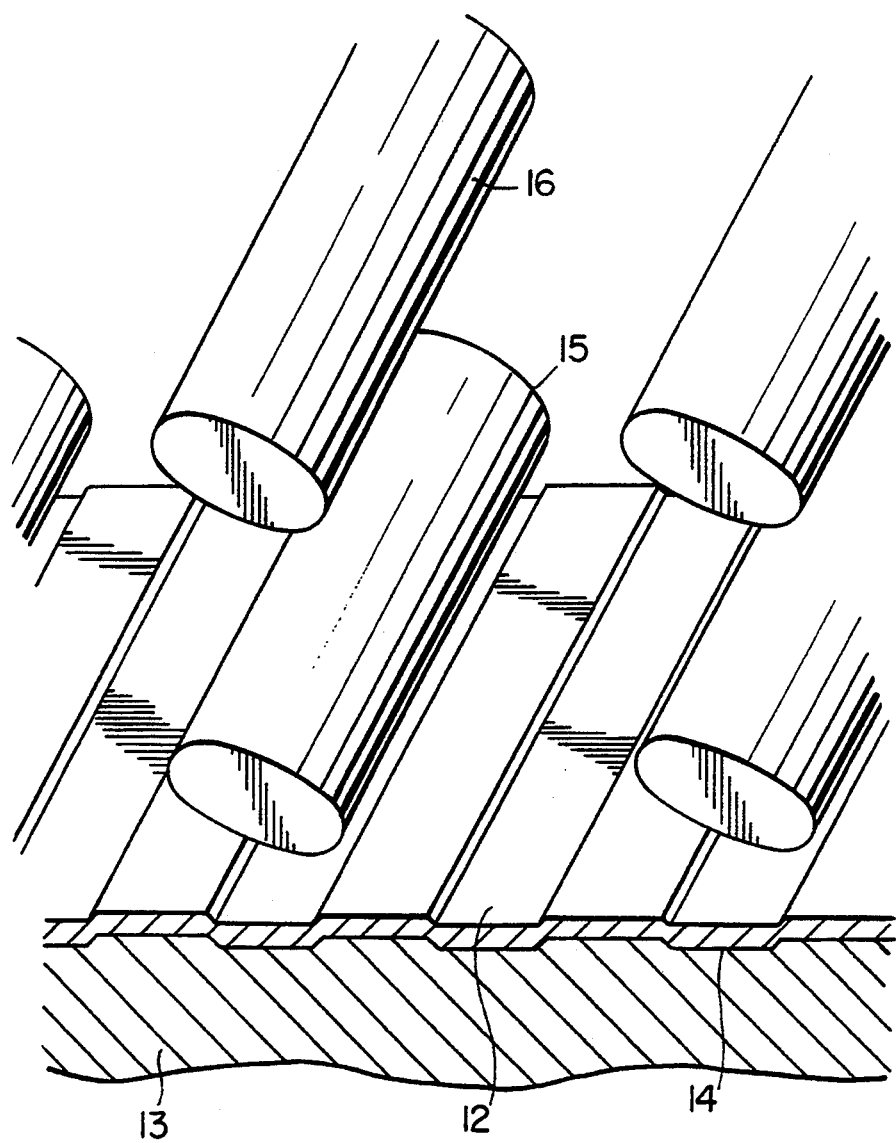
FIG. 6 is a perspective view showing the structure of a recording medium of another embodiment according to the present invention featuring an elliptical cylinder arrangement.

FIG. 6 illustrates an elliptical cylinder arrangement which is analogous to the circular cylinder arrangement of FIG. 5.

As set forth hereinabove, according to the present invention, it is possible to multiply record the information in a small region while changing the wavelength of the light beam at room temperature, and as a result, a memory of large capacity is realized. Accordingly, a very great advantage can be obtained.

What is claimed is:

1. A wavelength-multiple optical recording medium in which light irradiation is applied to record information in a multiplex manner while changing a wavelength of said light irradiation, said recording medium comprising a plurality of regions of at least one of a group of circular cylinders and a group of elliptical cylinders of which refractive indexes are different from that of areas just outside said regions and of which sizes are different from one another are arranged in an area of light irradiated by a reading light beam to construct said recording medium, and each of said regions contains one material of a group consisting of materials for a hole-burning memory and photochromic materials, wherein a difference in size between two circular cylinders within said group of circular cylinders or two elliptical cylinders within said group of elliptical cylinders and having their sizes closest to each other is in a range of 1/5000 to 1/5 of an average of the sizes.

2. A wavelength-multiple optical recording medium in which a light beam is applied to record information in a multiplex manner while changing a wavelength thereof, wherein a plurality of regions of which refractive indexes are different from that of areas just outside said regions and of which sizes are different from one another are arranged in an area of light irradiated by a reading light beam to construct said recording medium, wherein said plurality of regions is at least one of a group of elliptical cylinders and a group of circular cylinders, and a difference in size between two cylinders having their sizes closest to each other is in the range of 1/5000 to 1/5 of an average of the sizes.

3. A wavelength-multiple optical recording medium in which light irradiation is applied to record information in a multiplex manner while changing a wavelength of said light irradiation, wherein said recording medium is constructed by laminating multiple layers forming at least: one of a group of circular cylinders and a group of elliptical cylinders, an outer diameter of each layer corresponds to an associated wavelength, and each of said laminated multiple layers contains one material of a group consisting of materials for a hole-burning memory and photochromic materials, wherein a difference in size between two circular cylinders within said group of circular cylinders or two elliptical cylinders within said group of elliptical cylinders having their sizes closest to each other is in a range of 1/5000 to 1/5 of an average of the sizes.

4. A wavelength-multiple optical recording medium in which a light beam is applied to record information in a multiplex manner while changing a wavelength thereof, wherein said recording medium includes at least one of a group of elliptical cylinders and a group of circular cylinders, wherein each of said cylinders is constructed by laminating multiple layers, and an outer diameter of each layer corresponds to an associated wavelength, and a difference in size between two cylinders having their sizes closest to each other is in a range of 1/5000 to 1/5 of an average of the sizes.

5. A wavelength-multiple optical recording medium in which a light beam is applied to record information in a multiplex manner while changing a wavelength thereof, wherein said recording medium comprises at least one of a plurality of cylindrical members and a plurality of elliptical members each of which is made up of plural portions of which at least one of sizes and thicknesses vary slightly with respect to said portions, wherein a difference in Size between two cylindrical members of said plurality of cylindrical members or two elliptical members of said plurality of elliptical members having their sizes closest to each other is in a range of 1/5000 to 1/5 of an average of the sizes or thicknesses.

6. A wavelength-multiple optical recording medium in which a light beam is applied to record information in a multiplex manner while changing a wavelength thereof, wherein said recording medium comprises a large number of cylindrical members each of which is made up of plural portions of which sizes or thicknesses vary slightly with respect to said portions, wherein a different in size or thickness between two of said portions having their sizes or thicknesses closest to each other is in a range of 1/5000 to 1/5 of an average of said sizes or thicknesses.

* * * * *